United States Patent
Rom

(10) Patent No.: US 7,186,052 B2
(45) Date of Patent: Mar. 6, 2007

(54) VEHICLE TIRE DEFLATING APPARATUS

(76) Inventor: Paul Rom, 1423 Mapleview SE., Kentwood, MI (US) 49508

( * ) Notice: Subject to any disclaimer, the term of this patent is extended or adjusted under 35 U.S.C. 154(b) by 0 days.

(21) Appl. No.: 11/100,782

(22) Filed: Apr. 7, 2005

(65) Prior Publication Data

US 2005/0229476 A1 Oct. 20, 2005

Related U.S. Application Data

(60) Provisional application No. 60/560,141, filed on Apr. 7, 2004.

(51) Int. Cl.
*E01F 13/12* (2006.01)
*E01F 13/00* (2006.01)

(52) U.S. Cl. .......................................................... 404/6
(58) Field of Classification Search .................... 404/6, 404/9
See application file for complete search history.

(56) References Cited

U.S. PATENT DOCUMENTS

| | | | |
|---|---|---|---|
| 472,997 A * | 4/1892 | Hayward | 188/32 |
| 4,804,070 A * | 2/1989 | Bohler | 188/32 |
| 4,995,756 A | 2/1991 | Kilgrow et al. | 404/6 |
| 5,253,950 A | 10/1993 | Kilgrow et al. | 404/6 |
| 5,775,832 A | 7/1998 | Kilgrow et al. | 404/6 |
| 5,820,293 A | 10/1998 | Groen et al. | 404/6 |
| 5,832,759 A * | 11/1998 | Yamabe | 70/226 |
| 5,890,832 A | 4/1999 | Soleau | 404/6 |
| 5,904,443 A | 5/1999 | Soleau | 404/6 |
| 5,927,108 A * | 7/1999 | Pierce | 70/19 |
| 6,045,293 A | 4/2000 | Dickinson | 404/6 |
| 6,048,128 A | 4/2000 | Jones, III et al. | 404/6 |
| 6,116,062 A * | 9/2000 | Markegard et al. | 70/19 |
| 6,155,745 A | 12/2000 | Groen et al. | 404/6 |
| 6,206,608 B1 | 3/2001 | Blevins et al. | 404/6 |
| 6,312,189 B1 | 11/2001 | Marphetia | 404/6 |
| 6,357,961 B1 * | 3/2002 | Marphetia | 404/6 |
| 6,390,245 B1 * | 5/2002 | Metz | 188/32 |
| 6,398,452 B1 | 6/2002 | Wagner et al. | 404/6 |
| 6,409,418 B1 | 6/2002 | Blair et al. | 404/6 |
| 6,474,903 B1 | 11/2002 | Marts et al. | 404/6 |
| 6,725,979 B1 * | 4/2004 | Snook | 188/32 |
| 6,749,362 B1 * | 6/2004 | Eichenberg | 404/6 |
| 2004/0045774 A1 * | 3/2004 | D'Alessio | 188/4 R |

* cited by examiner

*Primary Examiner*—Raymond Addie
(74) *Attorney, Agent, or Firm*—Van Dyke, Gardner, Linn & Burkhart, LLP

(57) ABSTRACT

A vehicle tire deflating apparatus includes a first member, with a tire facing side, and a second member, with a tire facing side spaced from the first member. An interconnecting member locates the first member relative to the second member by a distance sufficient for the first member and the second member to straddle a vehicle tire and, further, holds at least one of the first or second members in a fixed orientation. At least one tire penetrating member is provided at each of the tire facing sides of the first member and the second member for penetrating a vehicle tire when the vehicle tire is located between the first member and the second member and moves toward either of the first member and the second member.

22 Claims, 11 Drawing Sheets

VEHICLE TIRE DEFLATING APPARATUS

The present application claims priority from provisional application Ser. No. 60/560,141, filed Apr. 7, 2004.

TECHNICAL FIELD AND BACKGROUND OF THE INVENTION

The present invention relates to an apparatus for deflating a tire of a vehicle, which is especially suitable for use by an officer when engaged in a traffic stop.

Over the years, there have been countless incidents where officers and/or uninvolved citizens have been injured during a traffic stop by an occupant of the vehicle or by the vehicle itself when the driver attempts to flee the scene.

To stop moving vehicles, roadblock strips have been developed that are thrown across the path of the moving vehicle. Each strip includes spikes, which deflate the tires of the vehicle when the vehicle runs over the strip. However, the strips are typically placed in the path of a moving vehicle and often when the vehicle is operating at extremely high speeds. Therefore, when the vehicle runs over the strips and the tires of the vehicle are deflated, injuries to the occupant or occupants of the vehicle or to innocent bystanders can occur.

Accordingly, there is a need for an apparatus that will reduce the likelihood of a stopped vehicle unlawfully leaving the scene during a traffic stop, which will lesson the likelihood of injuries to police and other innocent bystanders.

SUMMARY OF THE INVENTION

Accordingly, an apparatus that can be used during a simple traffic stop is provided that severely limits the ability of a driver of a vehicle to unlawfully leave the scene, for example, of a traffic stop. The apparatus incorporates a plurality of spikes, which are adapted to puncture and deflate a tire, when the tire is rolled either forward or backward over the apparatus.

In one form of the invention, a vehicle tire deflating apparatus includes a first member with a tire facing side, a second member with a tire facing side spaced from the second member, and an interconnecting member, which locates the first member relative to the second member by a distance sufficient for the first member and the second member to straddle a vehicle tire. In addition, the interconnecting member holds at least one of the first member and the second member in a fixed orientation. At least one tire penetrating member is provided at each of the tire facing sides of the first member and the second member for penetrating a vehicle tire when the vehicle tire is located between the first member and the second member and moves toward either the first member or the second member.

In one aspect, one of the members comprises a block with at least one flat side, for example, a wedge-shaped block. Preferably, each of the members comprises a wedge-shaped block.

In other aspects, each of said tire penetrating members comprises a tapered spike. In addition, each tire penetrating member preferably includes an air passage extending therealong to facilitate the deflation of the tire. Preferably, each of the first and second members includes a plurality of tire penetrating members.

In another aspect, the interconnecting member includes a handle. For example, to make the apparatus more compact, the handle may incorporate a hinge wherein at least a portion of the handle can be folded with respect to the interconnecting member.

In yet another aspect, the interconnecting member is adapted to vary the spacing between the first member and the second member. For example, the handle and interconnecting member may be configured such that rotation of the handle varies the length of the interconnecting member.

According to yet another aspect, each member includes opposed ends, with the tire facing sides extending between the opposed ends of the members, and with the interconnecting member being attached to one end of each of the members.

In another form of the invention, a vehicle tire deflating apparatus includes a first block, a second block, and an interconnecting member coupled to an end of the first block and coupled to an end of the second block. The interconnecting member locates the blocks relative to each other at a fixed distance sufficient so that the blocks may be positioned to straddle a vehicle tire and, further, holds the blocks at a fixed orientation. A plurality of tire penetrating members are provided at the tire facing sides of each of the blocks wherein a vehicle tire located between the blocks is straddled by the tire penetrating members for penetrating the tire when the vehicle tire moves toward either of the blocks.

In one aspect, the apparatus further includes a handle that is mounted to the interconnecting member to facilitate alignment of the blocks on either side of a vehicle tire. In addition, the handle includes a first portion mounted to the interconnecting member and a second portion, which is hinged to the first portion to permit the second portion to be pivoted relative to said first portion to provide a more compact configuration of the apparatus.

In a further aspect, the handle includes a locking member for preventing the second portion from being pivoted relative to the first portion. For example, the locking member may comprise a collar mounted to either of the first portion or the second portion and is slideable over the hinge to thereby prevent the second portion from pivoting about the first portion.

In another aspect, the interconnecting member is adapted to adjust the spacing between the blocks to accommodate different vehicle tire sizes.

Accordingly, the present invention provides an apparatus that can be used in a routine traffic stop that is designed to deflate a tire of the vehicle if the driver of the vehicle attempts to unlawfully leave the scene.

These and other objects, advantages, purposes, and features of the invention will become more apparent from the study of the following description taken in conjunction with the drawings.

DETAILED DESCRIPTION OF THE DRAWINGS

DETAILED DESCRIPTION OF THE PREFERRED EMBODIMENTS

Figure 1:
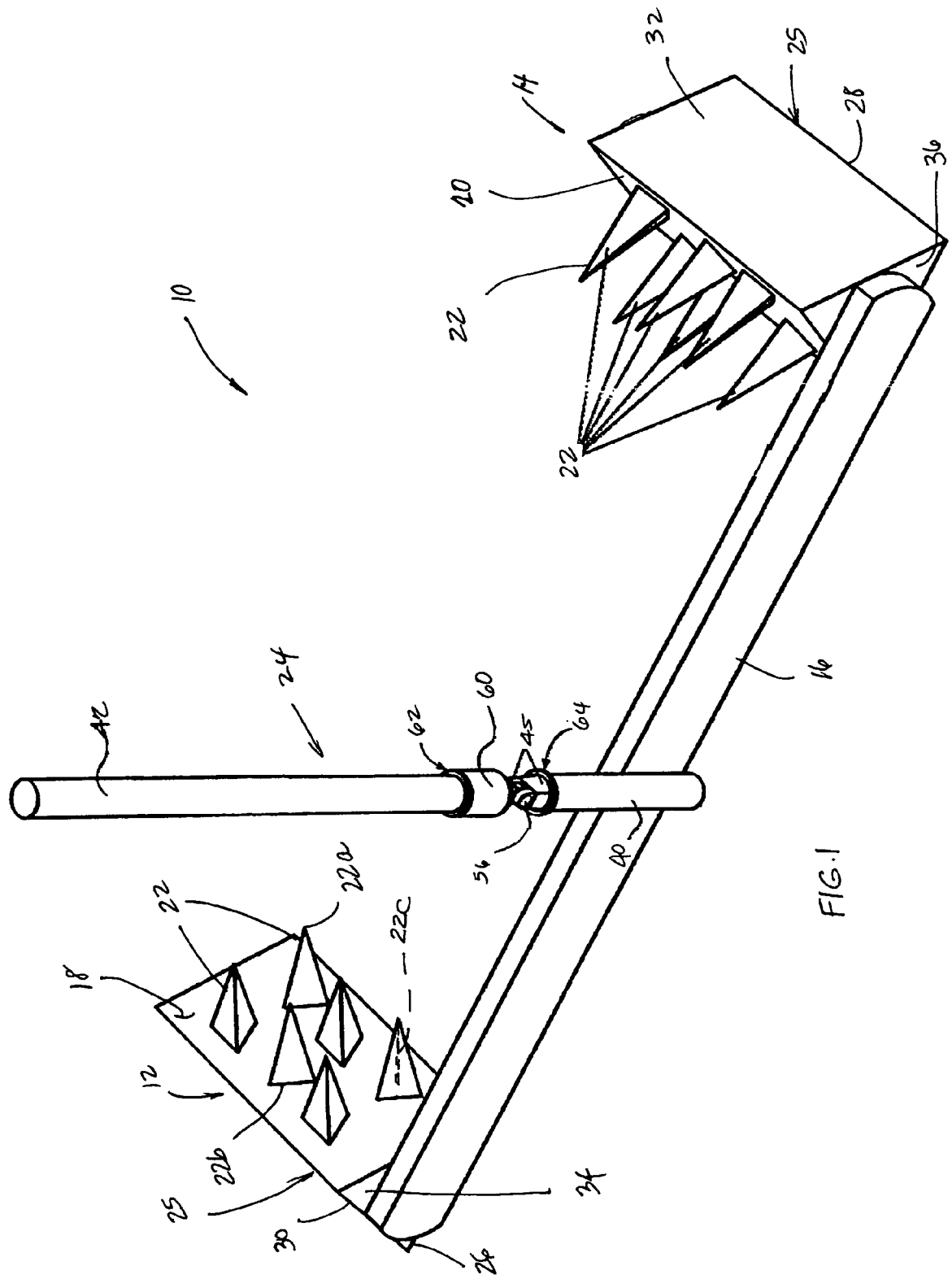
FIG. 1 is a perspective view of a vehicle tire deflating apparatus of the present invention.
Figure 2:
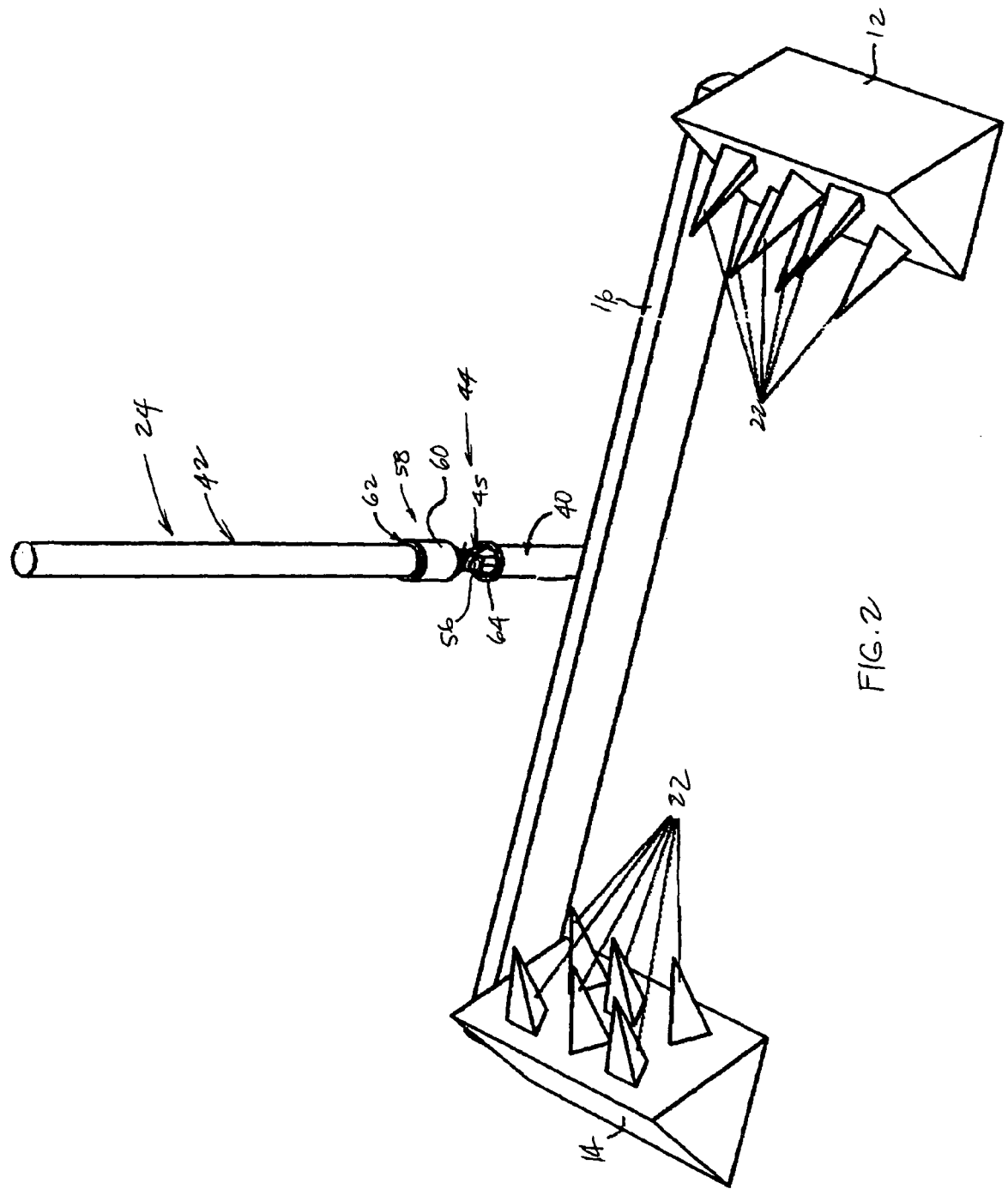
FIG. 2 is a second perspective view of the vehicle tire deflating apparatus of FIG. 1.
Figure 3:
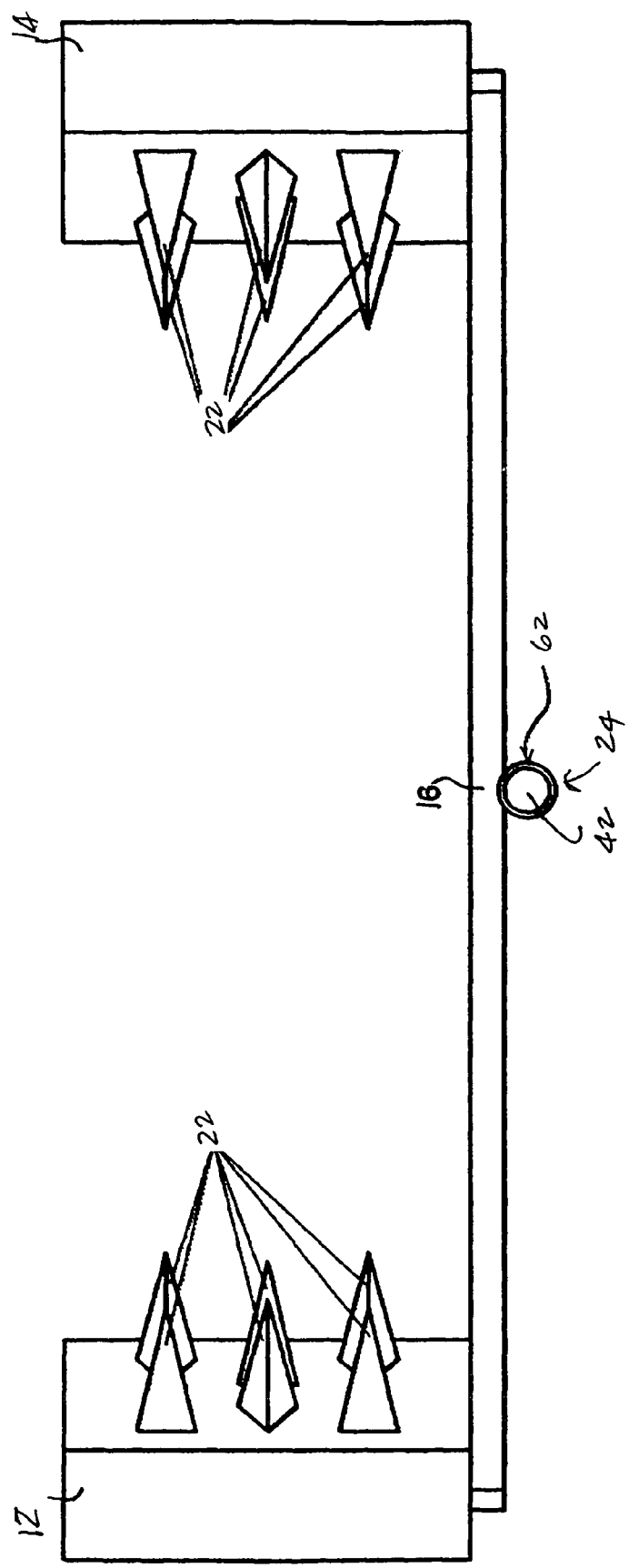
FIG. 3 is a top plan view of the vehicle tire deflating apparatus of FIG. 1.

Referring to FIGS. 1 and 2, the numeral 10 generally designates a vehicle tire deflating apparatus of the present invention. As will be more fully described below, apparatus 10 is particularly suitable for use during a routine traffic stop in which an officer may place the apparatus about a vehicle tire to reduce the risk of the driver of the vehicle fleeing from the scene. As will be more fully described below, apparatus 10 is adapted to straddle a tire of a vehicle and, further, adapted to deflate the tire should the vehicle move either forward or in reverse.

Figure 4:
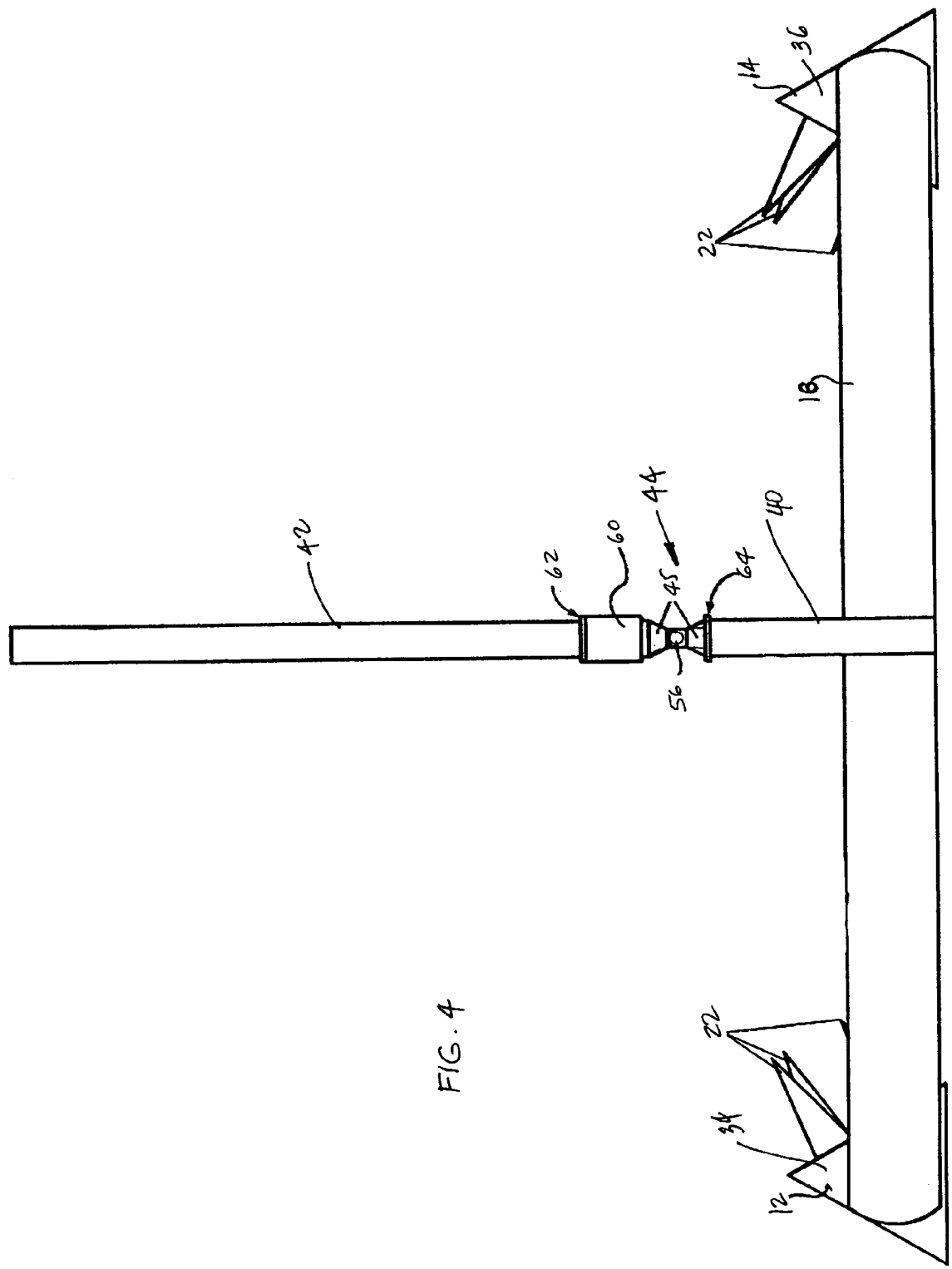
FIG. 4 is a front elevation view of the vehicle tire deflating apparatus of FIG. 1.
Figure 5:
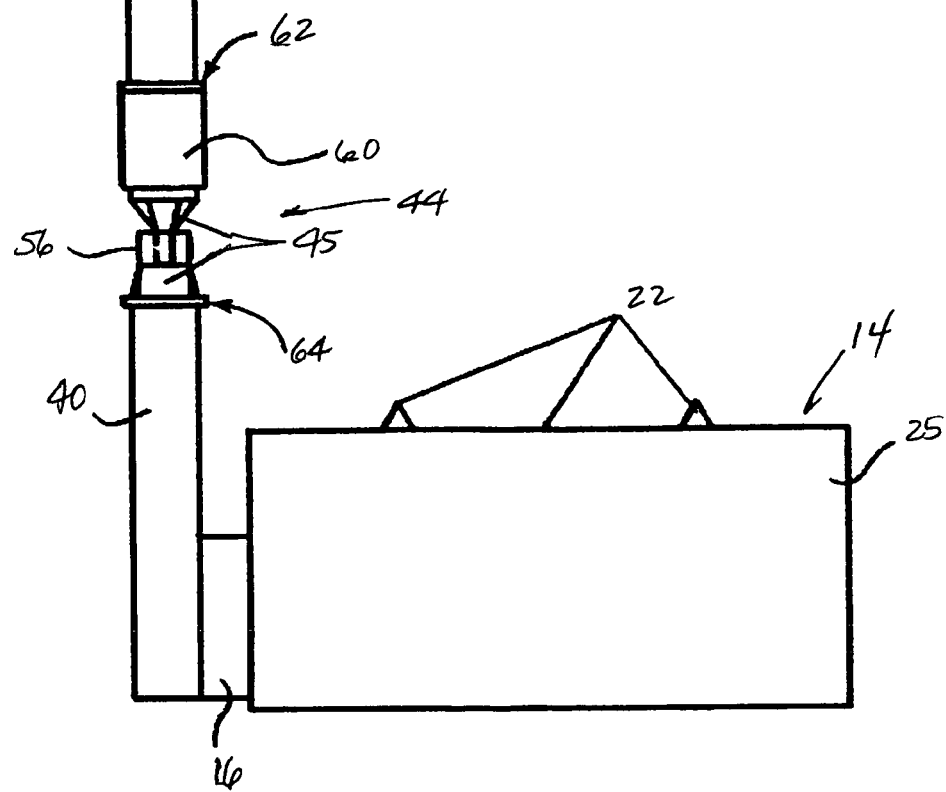
FIG. 5 is a side elevation view of the vehicle tire deflating apparatus of FIG. 4.

Referring to FIGS. 1 and 2, apparatus 10 includes a pair of members 12 and 14, which are connected by an interconnecting member 16 that holds the respective members 12, 14 at a fixed spacing that is sufficient so that members 12 and 14 may be positioned on either side of a vehicle tire (such as shown in phantom in FIG. 4) to thereby straddle the vehicle tire. Each member 12, 14 includes a tire facing side 18 and 20 and plurality of tire penetrating members 22, which are configured to penetrate and deflate a tire when the tire rolls onto one or more of members 22. It should be appreciated that the number of tire penetrating members may be increased or decreased. Furthermore, each member may include a single tire penetrating member, though the more tire penetrating members the greater the likelihood that the tire will be deflated and, further, the faster the deflation.

As best understood from FIGS. 1 and 2, tire penetrating members 22 comprise spikes that are tapered from their respective distal ends 22a to their base ends 22b. Furthermore, each member 22 includes an air passage extending from its distal end to its base end to further facilitate the deflation of the tire. For example, the passage may exit at a side of the tire penetrating member or through its base through its respective member (12, 14). Suitable spikes are available from Magnum Spike and preferably comprise a tapered wedge-shaped spike with a transverse hole 22c extending through the spike from its distal end to its base end to ensure that the tire is quickly deflated. Tire penetrating members 22 may be mounted to their respective members 12, 14 by fasteners, such as threaded fasteners, including screws, bolts, or the like, or rivets, or may be insert molded with members 12, 14, as will be more fully described below. For example, in preferred form members 12, 14 are hollow, with the fasteners extending into the tire penetrating members 22 from the cavity of the respective member 12, 14. With this hollow construction, members 12, 14 are preferably designed so that they are crushed when the tire rolls over the respective member. Though, the members may have a solid and/or rigid construction.

To facilitate placement of members 12 and 14 on either side of a vehicle tire, interconnecting member 16 is provided with a handle 24. Handle 24 is preferably mounted to the medial or central portion of interconnecting member 16, such as by welding, adhesive bonding, or by a strap or the like, so that an officer, for example, may lift the respective members 12 and 14 and, further, slide or push the respective members 12 and 14 on either side of a tire so that the tire penetrating members 22 straddle the tire so that if the tire is rolled forward or in reverse, one or more of the tire penetrating members will puncture and deflate the tire.

In the illustrated embodiment, each member 12 and 14 comprises a block 25 with a wedge-shaped body with a first side forming its respective tire facing side 18, 20, a second side forming a base side 26, 28 for resting on the ground adjacent the tire, and a third side forming a rear side 30, 32. In addition, blocks 25 include ends 34 and 36 to which interconnecting member 16 is rigidly mounted, for example, by fasteners, an adhesive, welds or the like. Though contemplated as being formed from a rigid polymeric material, such as a plastic, including a reinforced plastic material, members 12, 14, and interconnecting member 16 may be formed from metal or wood or from a composite material. In addition, when formed from a polymeric material, block 25 may be molded using injection molding and, optionally, with members 22 inserted molded with block 25.

Although illustrated as a wedge-shaped block, members 12, 14 may comprise other shaped blocks, including a rounded block, or a multi-sided block. In each instance, it is preferred that the block have at least one generally flat or planar side to provide an even bearing surface for resting on the ground.

Referring to FIGS. 4–7, handle 24 includes two portions with a lower portion 40 being mounted to interconnecting member 16 and an upper portion 42 that is pivotally mounted to lower portion 40 by a pivot connection 44. In the illustrated embodiment, lower portion and upper portion 40, 42 comprise round tubular members; however, it can be appreciated that other shapes and types of members, including solid rod-like members may also be used. Pivot connection 44 allows upper portion 42 to be pivoted with respect to lower portion 40 to facilitate a placement of the respective members 12 and 14 on either side of the tire of a vehicle. Furthermore, pivot connection 44 allows the upper member 40 to be pivoted to a more compact configuration for storage in the officer's vehicle, for example.

Figure 6:
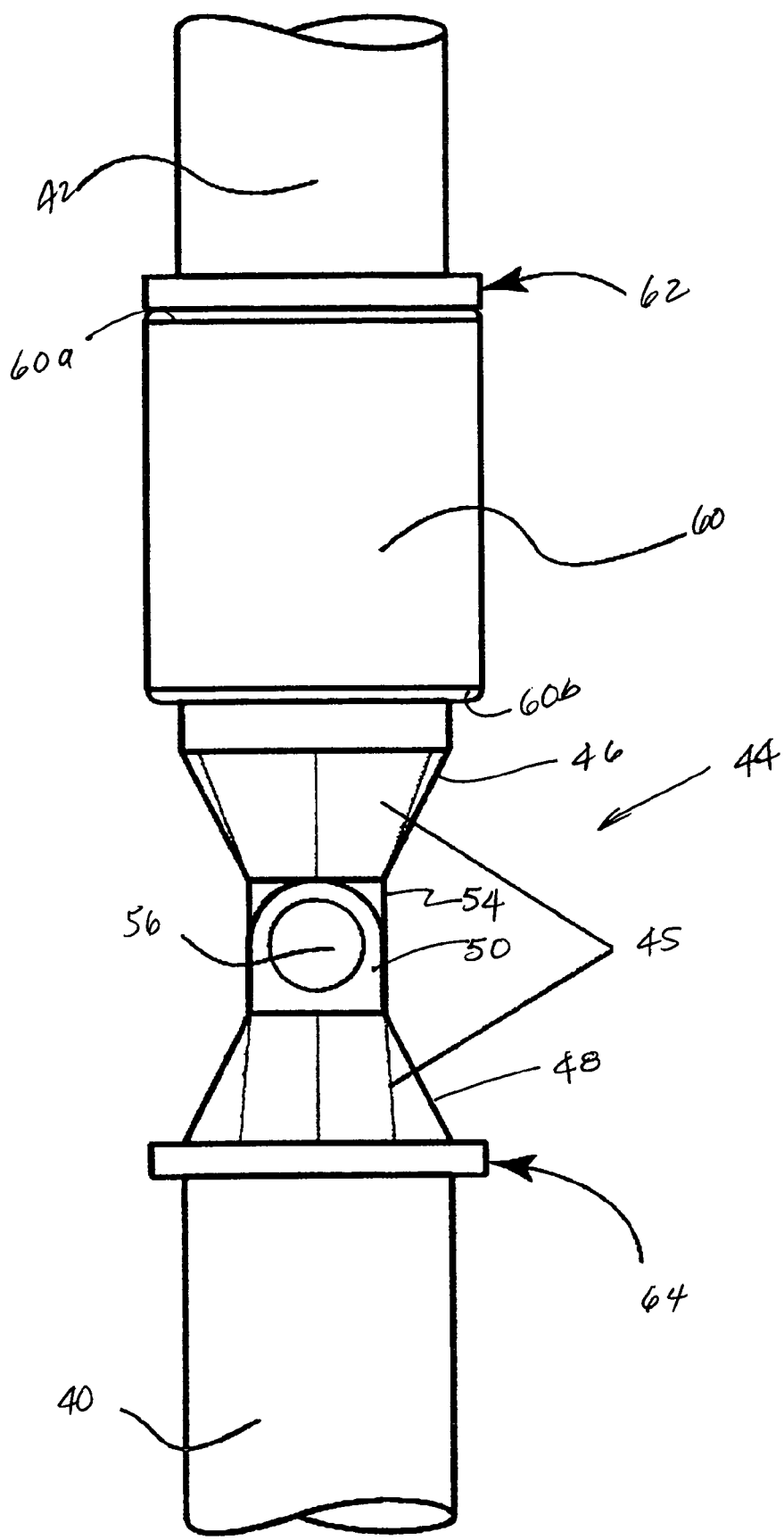
FIG. 6 is an enlarged elevation view of the hinge of the handle of the tire deflating apparatus of FIGS. 1–5.
Figure 7:
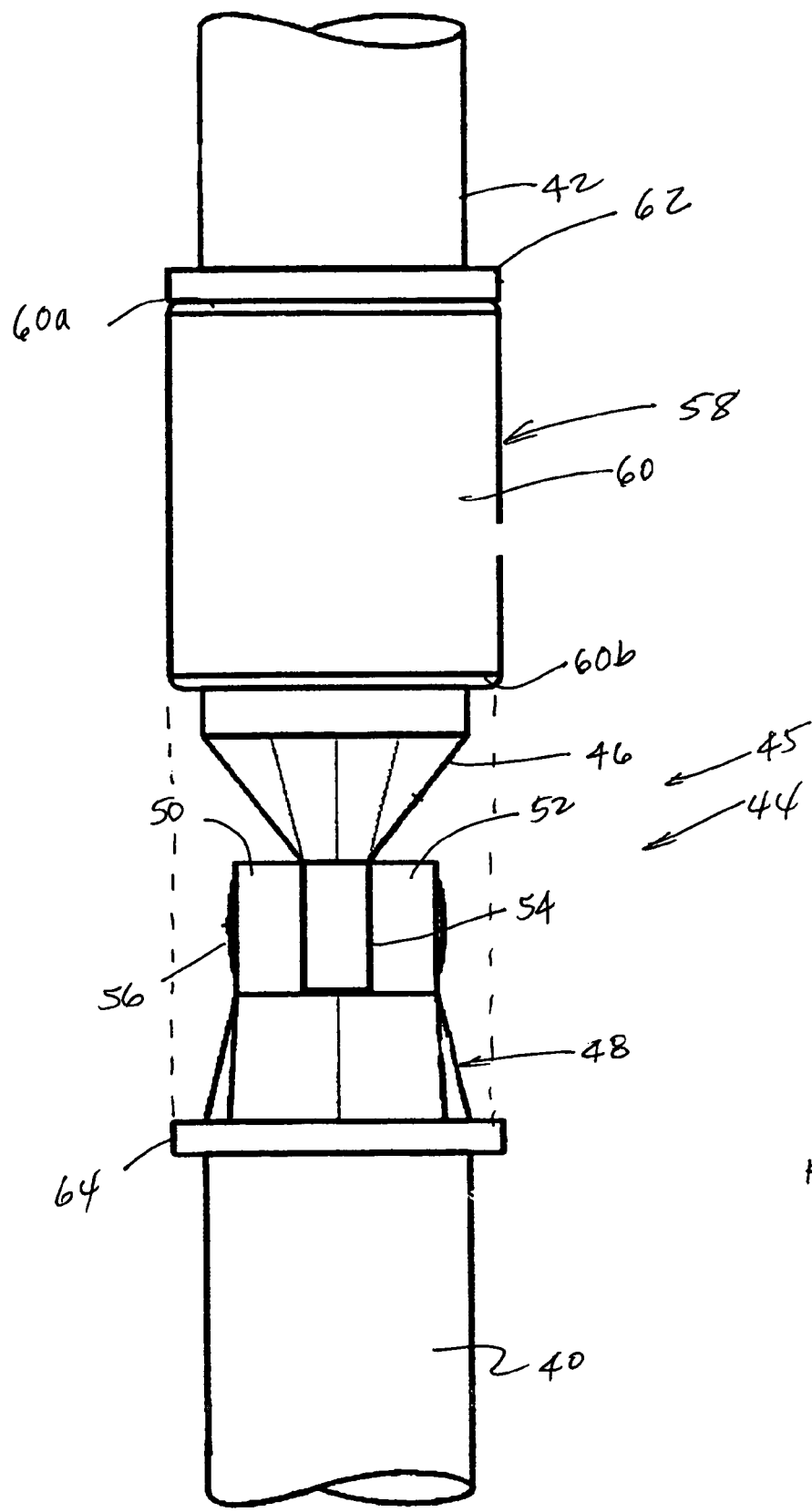
FIG. 7 is an enlarged side elevation view of the hinge of FIG. 6.

As best seen in FIGS. 6 and 7, pivot connection 44 is formed between a lower tapered end 46 of upper portion 42 and the upper tapered end 48 of lower portion 40. In the illustrated embodiment, pivot connection 44 comprises a hinge 45 that is formed by a pair of spaced apart flanges 50 and 52 on upper end 48 with a space therebetween to receive the downwardly depending flange 54 of lower end 46, which is pinned between the respective flanges 50 and 52 by a hinge pin 56. It should be understood, however, that the hinge configuration may be inverted. Furthermore, other hinge connections may be used, for example a ball and socket arrangement or the like.

As noted previously, pivot connection 44 is provided to allow the upper portion of the handle 24 to be pivoted with respect to lower portion 42 of handle 24 for easy storage and, further, to facilitate the positioning of the spikes with respect to the vehicle tire. However, it may also be desired to limit the pivoting of upper portion 42 with respect to lower portion 40. Hence, pivot connection 44 optionally incorporates a locking member 58, such as a collar 60, which is slidably mounted to one of the respective portions of the handle 24 between a position above or below hinge 45 to an extended position where the collar 60 extends over the hinge 45 so that the upper portion 42 and lower portion 40 are fixed in alignment.

In the illustrated embodiment, collar 60 is mounted to upper portion 42 and is movable between an unlocked position to a locked position. In the unlocked position, upper edge 60*a* of collar 60 abuts a stop 62 mounted to upper portion 42 wherein collar 60 is spaced above tapered portion 46 to allow free pivoting of upper portion 42 with respect to lower portion 40. In the locked position, collar 60 is moved to an extended position (such as shown in phantom in FIG. 7) over hinge 45 where the lower edge 60*b* of collar 60 contacts a stop 64 provided on lower portion 40 so that collar 60 straddles between lower end 46 of upper portion 42 and upper end 48 of lower portion 40.

In addition, referring again to FIGS. 1–4, interconnecting member 16 comprises a rectangular bar and may be adapted to vary its length to adjust the spacing between the respective members 12 and 14 to accommodate different size tires. For example, interconnecting member 16 may comprise two sliding members, which are guided with respect to each other by, for example, a pin or rail or other guide structure or structures to increase or decrease the spacing between the respective blocks, for example. In addition, interconnecting member 16 may incorporate a mechanism, such as a drive rod, including a threaded drive rod that extends or retracts the sliding members. For example, the mechanism may include a gear, which is mounted to one of the sliding members that drives a threaded rod or rack that is mounted to the other sliding member. Optionally, handle 24 may be adapted to impart the relative translation of the members of the interconnecting member so that an officer may simply rotate a handle to increase or decrease the spacing between the respective blocks. Alternately, the sliding members of the interconnecting members may be telescoping members and may be driven, for example, by a similar mechanism noted above. Referring to FIGS. 1 and 2, the numeral 10 generally designates a vehicle tire deflating apparatus of the present invention. As will be more fully described below, apparatus 10 is particularly suitable for use during a routine traffic stop in which an officer may place the apparatus about a vehicle tire to reduce the risk of the driver of the vehicle fleeing from the scene. As will be more fully described below, apparatus 10 is adapted to straddle a tire of a vehicle and, further, adapted to deflate the tire should the vehicle move either forward or in reverse.

Referring to FIGS. 8–11, the numeral 110 generally designates another embodiment of the tire deflating apparatus of the present invention. Similar to apparatus 10, apparatus 110 includes a pair of members 112 and 114, which are connected by an interconnecting member 116 that holds the respective members 112, 114 at a fixed spacing that is sufficient so that members 112 and 114 may be positioned on either side of a vehicle tire (such as shown in reference to apparatus 10 in FIG. 4) to thereby straddle the vehicle tire. Each member 112, 114 includes a tire facing side 118 and 120 and plurality of tire penetrating members 122, which are similar to members 122. It should be appreciated that the number of tire penetrating members may be increased or decreased. For further details of tire penetrating members 122, reference is made to members 22.

Similar to members 22, tire penetrating members 122 may be mounted to their respective members 112, 114 by fasteners, such as threaded fasteners, including screws, bolts, or the like, or rivets, or may be insert molded with members 112, 114. For example, in preferred form members 112, 114 are hollow, with the fasteners extending into the cavity of the respective member 112, 114. With the hollow construction, members 112, 114 are preferably designed so that they are crushed when the tire rolls over the respective member. Though, the members may have a solid and/or rigid construction.

To facilitate placement of members 112 and 114 on either side of a vehicle tire, interconnecting member 116 is provided with a handle 124. Handle 124 is preferably mounted to the medial or central portion of interconnecting member 116, such as by welding, adhesive bonding, or by a strap or the like, so that an officer, for example, may lift the respective members 112 and 114 and, further, slide or push the respective members 112 and 114 on either side of a tire so that the tire penetrating members 122 straddle the tire so that if the tire is rolled forward or in reverse, one or more of the tire penetrating members will puncture and deflate the tire.

Figure 9:
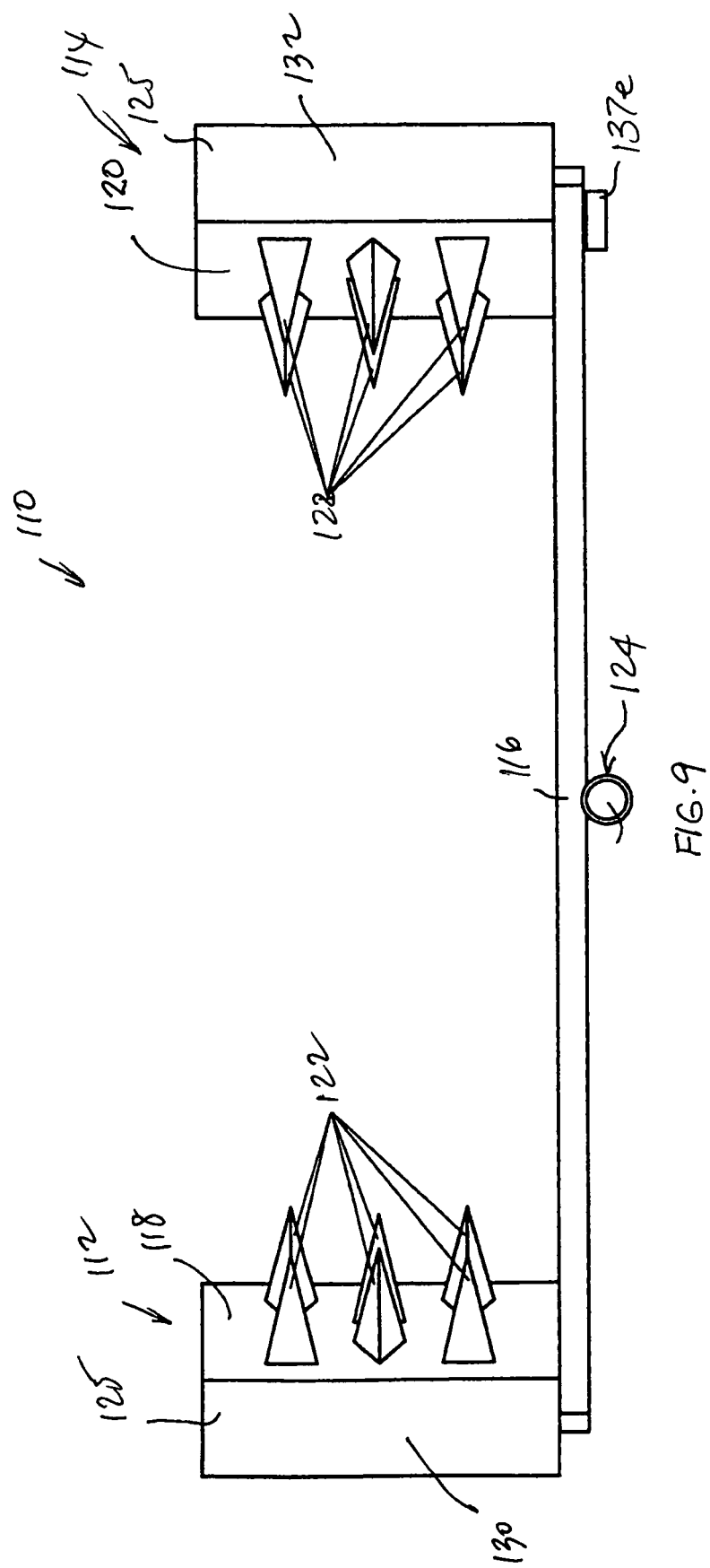
FIG. 9 is a top plan view of the vehicle tire deflating apparatus of FIG. 8.
Figure 10:
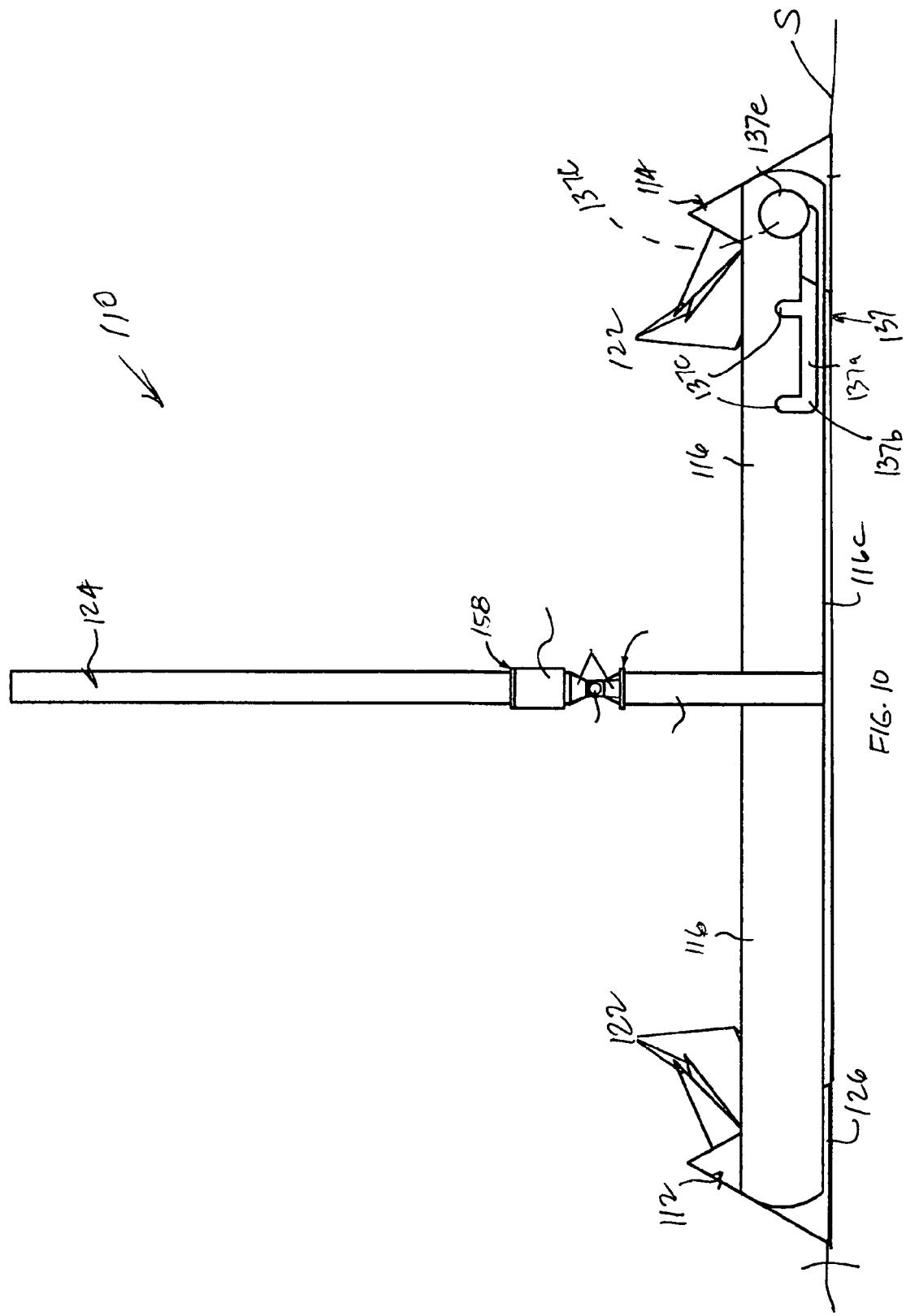
FIG. 10 is a front elevation view of the vehicle tire deflating apparatus of FIG. 8.

As best understood from FIGS. 9 and 10, each member 112 and 114 comprises a wedge-shaped block 125 with a first side forming its respective tire facing side 118, 120, a second side forming a base side 126, 128 for resting on the ground adjacent the tire, and a third side forming a rear side 130, 132. In addition, blocks 125 include ends 134 and 136 to which interconnecting member 116 is mounted. In the illustrated embodiment, one end 116*a* of interconnecting member 116 is rigidly mounted to member 112 for example, by fasteners, an adhesive, welds or the like, that mount member 116 to end 134. The other end 116*b* is interconnected with member 114 by an adjustable connection 137.

Figure 8:
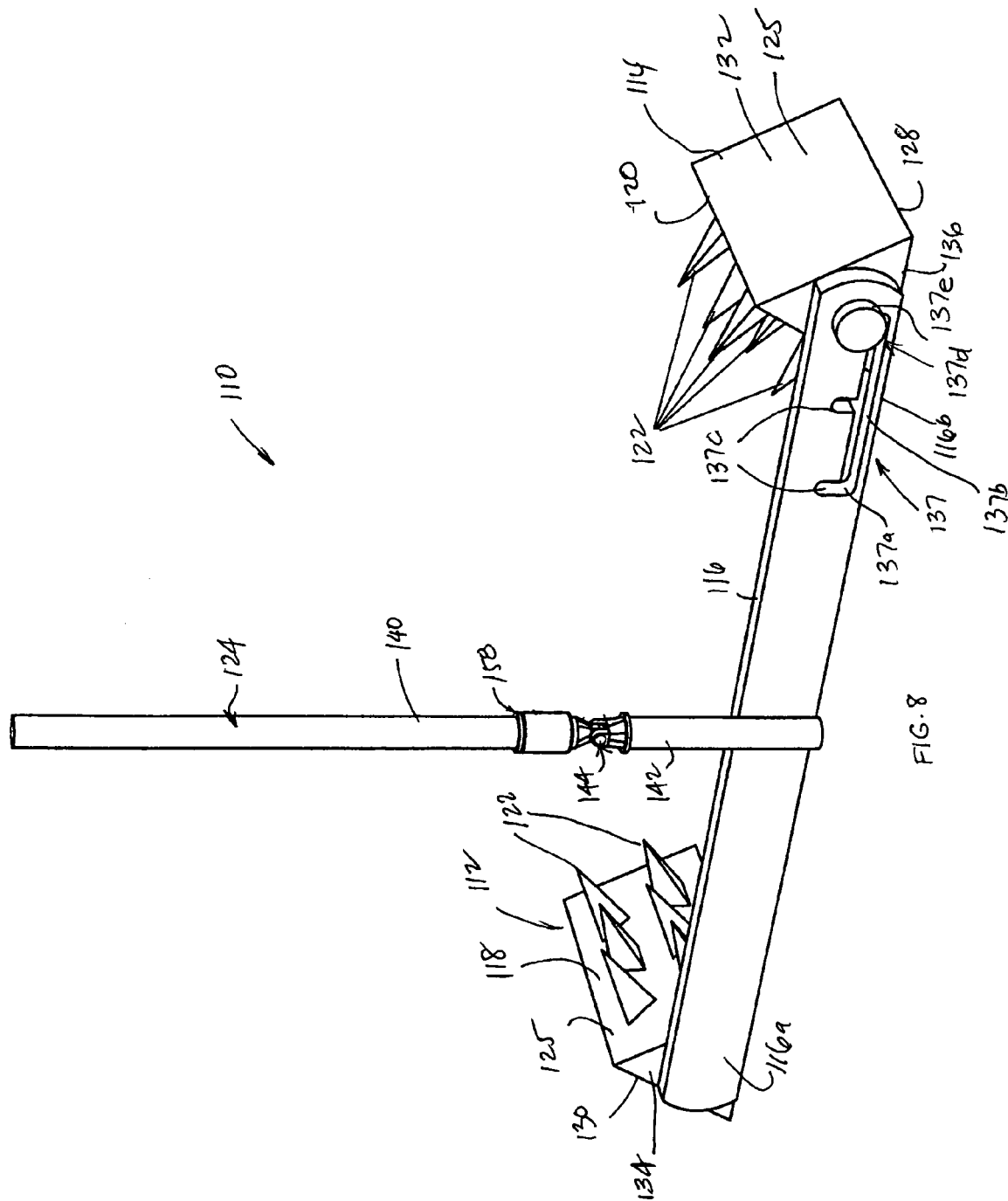
FIG. 8 is a perspective view of another embodiment of a vehicle tire deflating apparatus of the present invention.

Connection 137 allows the position of member 114 to be adjusted relative to member 112. In the illustrated embodiment, connection 137 allows the lateral spacing between members 112, 114 to be varied. As best seen in FIGS. 8 and 10, connection 137 is provided by an elongated opening 137*a* formed in member 116. Opening 137 forms a lower longitudinal guide 137*b* and a plurality of notches 137*c*. In the illustrated embodiment, opening 137*a* includes three notches 137*c* that provide three distinct positions for member 114—two on the opposed ends of opening 137*a* and one in the middle. Member 114 includes an outwardly projecting pin 137*d* that extends through interconnecting member 116 in opening 137*a* but is secured to member 116 by an enlarged end 137*e*, such as a flange, which has a diameter larger than the maximum height (as viewed in FIG. 10) of opening 137*a*. Pin 137*c* guides member 114 along opening but when located in one of the notches, fixes the position of member 114 relative to member 112.

As best understood from FIG. 10, guide 137*b* is located adjacent the lower edge 116*c* of member 116 so that when members 112 and 114 are positioned on a generally horizontal surface S and handle 124 is pressed toward surface S, pin 137*d* will be urged upwardly. When pin 137*d* is aligned with a notch, pin 137*d* will be urged into the aligned notch to thereby fix the relative positions of the two members (112, 114).

As would be understood, when a user lifts apparatus 110 by handle 126, the weight of member 114 will generally cause pin 137*c* to move out of the aligned notch so that member 114 may be moved laterally with respect to member 112 along interconnecting member 116.

Though contemplated as being formed from a rigid polymeric material, such as a plastic, including a reinforced plastic material, members 112, 114, and interconnecting member 116 may be formed from metal or wood or from a composite material. In addition, when formed from a polymeric material, block 125 may be molded using injection molding and, optionally, with members 122 inserted molded with block 125, as noted above.

Although illustrated as a wedge-shaped block, members 112, 114 may comprise other shaped blocks, including a rounded block, or a multi-sided block. In each instance, it is preferred that the block have at least one generally flat or planar side or pair of spaced contact surfaces to provide a bearing surface or surfaces for resting on the ground.

Figure 11:
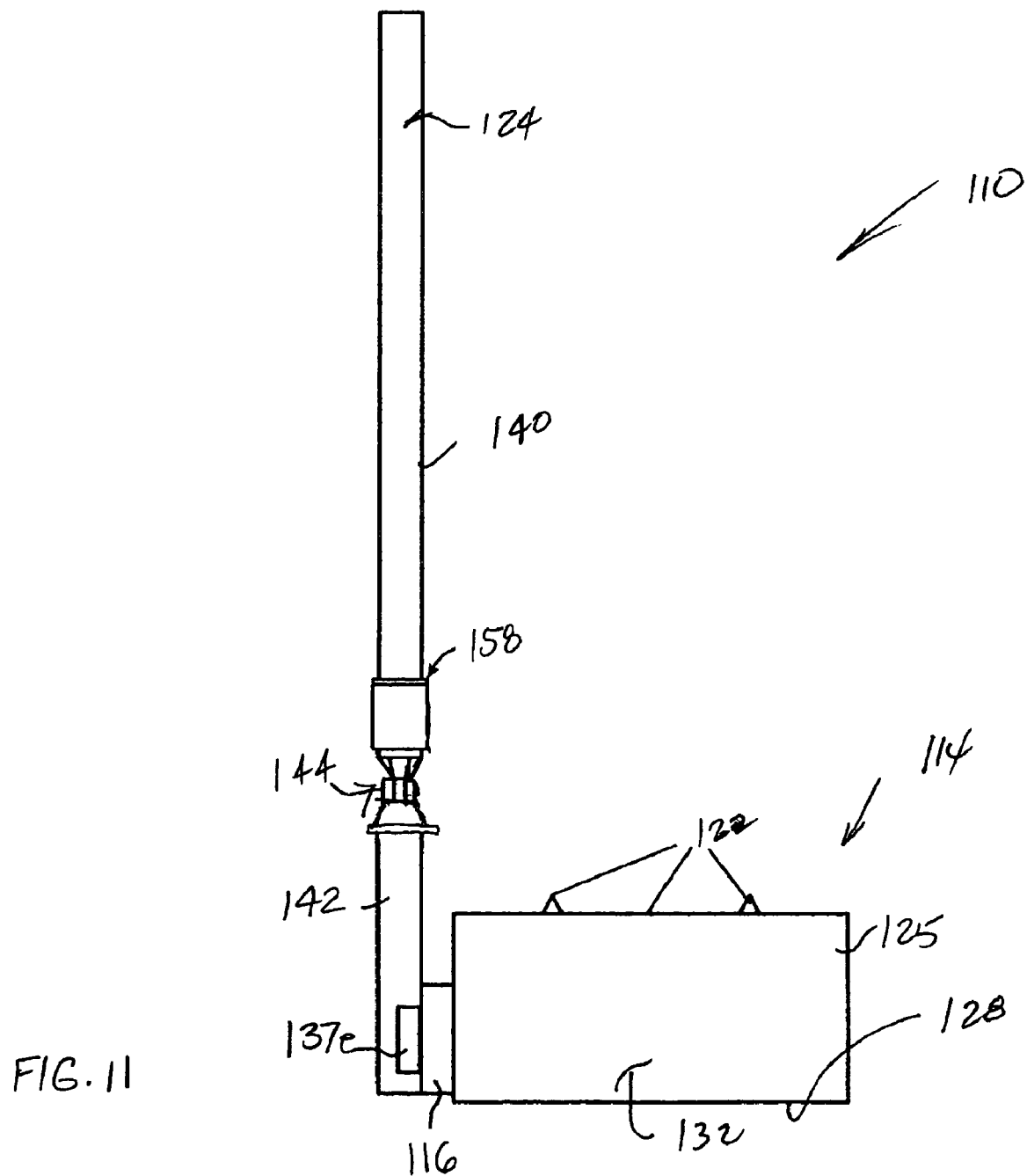
FIG. 11 is a side elevation view of the vehicle tire deflating apparatus of FIG. 8.

Referring to FIGS. 8, 10, and 11, handle 124 includes two portions, a movable upper portion 140 and a lower portion 142 fixed to member 116. Upper portion 142 is mounted to lower portion 140 by a pivot connection 144. Similar to the first embodiment, lower portion and upper portion 140, 142 comprise round tubular members; however, it can be appreciated that other shapes and types of members, including solid rod-like members may also be used. Pivot connection 144 allows upper portion 142 to be pivoted with respect to lower portion 140 to facilitate placement of the respective members 112 and 114 on either side of a tire of a vehicle. Furthermore, pivot connection 144 allows the upper member 140 to be pivoted to a more compact configuration for storage in the officer's vehicle, for example.

Similar to interconnecting member 16, interconnecting member 116 comprises a rectangular bar, which is adapted to vary the spacing between the respective members 112 and 114 to accommodate different size tires. Interconnecting member 116 may also be configured to adjust its length to further increase the range of adjustability of the spacing between members 112, 114. For example, interconnecting member 116 may comprise two sliding members, which are guided with respect to each other by, for example, a pin or rail or other guide structure or structures to increase or decrease the spacing between the respective blocks, for example. In addition, interconnecting member 116 may also incorporate a mechanism, such as a drive rod, including a threaded drive rod that extends or retracts the sliding members. For example, the mechanism may include a gear, which is mounted to one of the sliding members that drives a threaded rod or rack that is mounted to the other sliding member. Optionally, similar to handle 24, handle 124 may be adapted to impart the relative translation of the members of the interconnecting member so that an officer may simply rotate a handle to increase or decrease the spacing between the respective blocks. Alternately, interconnecting members 116 may be formed from telescoping members and may be driven, for example, by a similar mechanism noted above.

Accordingly, the present invention provides an apparatus that can be placed around a tire of a vehicle and is adapted to puncture the tire of the vehicle when the vehicle is moved either forward or in reverse. While several forms of the invention have been shown and described, other changes and modifications may be made without departing from the scope of the invention. For example, as noted the number of tire penetrating members may be increased or decreased. In addition, the shape and configuration of the various members may be varied. Furthermore, while the handles are depicted with a hinge that provides a pivotal connection, the handles may comprise a telescoping handles or fixed length handles instead. These and other features and modifications may be made without departing from the scope, which is defined by the claims, which follow as interpreted under the principles of patent law, including the doctrine of equivalents.

I claim:

1. The vehicle tire deflating apparatus comprising:
a first member having a tire facing side;
a second member having a tire facing side spaced from said first member;
an interconnecting member locating said first member relative to said second member by a distance sufficient for said first member and said second member to straddle a vehicle tire and, further, holding at least one of said first member and said second member in a fixed orientation; and
at least one tire penetrating member provided at each of said tire facing sides of said first member and said second member for penetrating a vehicle tire when the vehicle tire is located between said first member and said second member and moves toward either of said first member and said second member and wherein at least one of said first and second members is adapted to be crushed when a tire rolls over the respective member.

2. The vehicle tire deflating apparatus according to claim 1, wherein one of said first member and said second member comprises a block with at least one flat side.

3. The vehicle tire deflating apparatus according to claim 2, wherein said block comprises a wedge-shaped block.

4. The vehicle tire deflating apparatus according to claim 3, wherein each of said first member and said second member comprises a wedge-shaped block.

5. The vehicle tire deflating apparatus according to claim 1, wherein each of said tire penetrating members comprises a tapered spike.

6. The vehicle tire deflating apparatus according to claim 1, wherein each of said tire penetrating member includes an air passage to facilitate the deflation of the tire.

7. The vehicle tire deflating apparatus according to claim 1, wherein each of said first and second members includes a plurality of said tire penetrating members.

8. The vehicle tire deflating apparatus according to claim 1, wherein said interconnecting member includes a handle.

9. The vehicle tire deflating apparatus according to claim 8, wherein said handle includes a hinge wherein at least a portion of said handle can be folded with respect to said interconnecting member.

10. The vehicle tire deflating apparatus according to claim 1, wherein said interconnecting member is adapted to vary said spacing between said first member and said second member.

11. The vehicle tire deflating apparatus according to claim 10, wherein one of said first and second members is movably mounted to said interconnecting member.

12. The vehicle tire deflating apparatus according to claim 1, wherein each of said first member and said second member includes opposed ends, said tire facing sides of each respective first and second members extending between said opposed ends of said respective first and second members, and said interconnecting member being attached to one of said opposed ends of each of said first and second members.

13. The vehicle tire deflating apparatus according to claim 1, wherein said first member and second member each comprise a hollow member.

14. A vehicle tire deflating apparatus comprising:
a first block having a tire facing side and an end;
a second block having a tire facing side and an end;
an interconnecting member coupled to said end of said first block and coupled to said end of said second block wherein said first block and said second black are cantilevered from said interconnecting member, said interconnecting member locating said first block relative to said second block at a spacing sufficient for said first and second-blocks to straddle a vehicle tire and further holding at least one of said first block and said second block at a fixed orientation; and
a plurality of tire penetrating members provided at each of said tire facing sides of said first and second blocks wherein a vehicle tire located between said first and second blocks is straddled by said tire penetrating members for penetrating the tire when the vehicle tire moves toward either of said first or second blocks and wherein at least one of said first and second blocks is adapted to be crushed when a tire rolls over the respective block.

15. The vehicle tire deflating apparatus according to claim 14, further comprising a handle, said handle mounted to said interconnecting member to facilitate positioning of said first and second blocks on either side of a vehicle tire.

16. A vehicle tire deflating apparatus comprising:
a first block having a tire facing side and an end;
a second block having a tire facing side and an end;
an interconnecting member coupled to said end of said first block and coupled to said end of said second block wherein said first block and said second block are cantilevered from said interconnecting member, said interconnecting member locating said first block relative to said second block at a spacing sufficient for said first and second blocks to straddle a vehicle tire and further holding at least one of said first block and said second block at a fixed orientation;
a plurality of tire penetrating members provided at each of said tire facing sides of said first and second blocks wherein a vehicle tire located between said first and second blocks is straddled by said tire penetrating members for penetrating the tire when the vehicle tire moves toward either of said first or second blocks;
a handle, said handle mounted to said interconnecting member to facilitate positioning of said first and second blocks on either side of a vehicle tire wherein said handle includes a first portion mounted to said interconnecting member and a second portion, said second portion being hinged to said first portion to permit said second portion to be pivoted relative to said first portion.

17. The vehicle tire deflating apparatus according to claim 16, wherein said handle includes a locking member for preventing said second portion from being pivoted relative to said first portion.

18. The vehicle tire deflating apparatus according to claim 17, wherein said locking member comprises a collar mounted to one of said first portion and said second portion.

19. The vehicle tire deflating apparatus according to claim 18, wherein said collar is mounted to said second portion and is slideable relative to said second portion over said hinge to thereby prevent said second portion from pivoting about said first portion.

20. The vehicle tire deflating apparatus according to claim 14, wherein said interconnecting member is adapted to adjust the spacing between said first and second blocks to accommodate different vehicle tire sizes.

21. The vehicle tire deflating apparatus according to claim 20, wherein said interconnecting member includes an elongate opening with a plurality of notches, one of said blocks including a pin, said pin mounting said one of said blocks to said interconnecting member and guiding said one of said blocks along said elongate opening to thereby adjust said spacing between said blocks.

22. The vehicle tire deflating apparatus according to claim 14, wherein said first block and said second block each comprise a hollow block.

* * * * *

UNITED STATES PATENT AND TRADEMARK OFFICE
CERTIFICATE OF CORRECTION

PATENT NO. : 7,186,052 B2  Page 1 of 1
APPLICATION NO. : 11/100782
DATED : March 6, 2007
INVENTOR(S) : Paul Rom It is certified that error appears in the above-identified patent and that said Letters Patent is hereby corrected as shown below:

Column 8:
Line 25, Claim 6, "member" should be --members--.
Line 58, Claim 14, "black" should be --block--.

Column 10:
Line 29, Claim 22, Delete "said" in the second occurrence.

Signed and Sealed this

Thirteenth Day of January, 2009

JON W. DUDAS
*Director of the United States Patent and Trademark Office*